United States Patent
Tseng et al.

(10) Patent No.: US 9,691,073 B2
(45) Date of Patent: *Jun. 27, 2017

(54) DISPLAYING SOCIAL OPPORTUNITIES BY LOCATION ON A MAP

(75) Inventors: Erick Tseng, San Francisco, CA (US); Matthew Cahill, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 732 days.

This patent is subject to a terminal disclaimer.

(21) Appl. No.: 13/198,071

(22) Filed: Aug. 4, 2011

(65) Prior Publication Data

US 2013/0036165 A1 Feb. 7, 2013

(51) Int. Cl.
*G06Q 30/02* (2012.01)
*G06Q 50/00* (2012.01)

(52) U.S. Cl.
CPC ......... *G06Q 30/02* (2013.01); *G06Q 30/0267* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 7,945,249 B2 * | 5/2011 | Fanelli et al. | ............. | 455/412.2 |
| 8,560,678 B2 * | 10/2013 | Tseng | ................ | G06F 17/30867 705/319 |
| 8,738,024 B1 * | 5/2014 | Kerr et al. | .................... | 342/458 |
| 8,751,636 B2 * | 6/2014 | Tseng | ................. | G06Q 30/0255 463/25 |
| 8,954,860 B1 * | 2/2015 | Hands | ............... | G06F 17/30873 715/738 |
| 9,152,946 B2 * | 10/2015 | Rankin, Jr. | ............. | G06Q 10/10 |
| 2006/0010100 A1 * | 1/2006 | McAvoy | ........... | G06F 17/30241 |
| 2008/0052288 A1 * | 2/2008 | Flinn | ................. | G06F 17/30699 |
| 2008/0068380 A1 * | 3/2008 | McAvoy | ........... | G06F 17/30241 345/428 |

(Continued)

OTHER PUBLICATIONS

Patent Cooperation Treaty, International Search Report and Written Opinion, International Patent Application No. PCT/US2012/046428, Sep. 28, 2012, 13 Pages.

(Continued)

*Primary Examiner* — Ninos Donabed
(74) *Attorney, Agent, or Firm* — Fenwick & West LLP

(57) ABSTRACT

A social networking system provides relevant content objects at the request of social networking system users. Relevance scores are determined for content objects by matching user location, user interests, and other social information to the content, location, and timing associated with content objects. A ranked list of content objects can be provided to the user, where the content objects are relevant to them based on their interests, location, and other social information. The system provides a user interface that displays a map containing pins, where each pin represents a content object in actionable proximity to a user. The content objects selected to be presented as pins to the user are those content objects with sufficiently high relevance scores. Multiple pins for a nearby area can be clustered. The user can switch between zoom levels for the map, thereby showing pins at varying distances from the user's current location.

17 Claims, 4 Drawing Sheets

(56) References Cited

U.S. PATENT DOCUMENTS

| | | | |
|---|---|---|---|
| 2008/0214148 A1 | 9/2008 | Ramer et al. | |
| 2009/0049408 A1* | 2/2009 | Naaman et al. | 715/835 |
| 2009/0055087 A1* | 2/2009 | Beacher | G01C 21/36 |
| | | | 701/532 |
| 2010/0306249 A1* | 12/2010 | Hill | G06F 17/30867 |
| | | | 707/769 |
| 2011/0004828 A1* | 1/2011 | Callicrate et al. | 715/738 |
| 2011/0083101 A1* | 4/2011 | Sharon et al. | 715/800 |
| 2011/0275432 A1* | 11/2011 | Lutnick | G07F 17/3232 |
| | | | 463/25 |
| 2011/0288962 A1* | 11/2011 | Rankin, Jr. | G06F 17/30525 |
| | | | 705/27.1 |
| 2011/0289010 A1* | 11/2011 | Rankin, Jr. | G06Q 50/16 |
| | | | 705/313 |
| 2011/0289106 A1* | 11/2011 | Rankin, Jr. | G06Q 10/10 |
| | | | 707/769 |
| 2012/0166530 A1* | 6/2012 | Tseng | G06Q 30/0255 |
| | | | 709/204 |
| 2015/0211881 A1* | 7/2015 | Stauber | G01C 21/3682 |
| | | | 701/532 |

OTHER PUBLICATIONS

Stone, B. et al., "Are Four Words Worth $25 Billion for Groupon? Inside Andrew Mason's plan to remake Groupon, fend off copycats, and change your spending habits forever," *Bloomberg Businessweek*, Mar. 17, 2011, six pages. [Online] [Retrieved Dec. 1, 2011] Retrieved from the Internet <URL:http://www.businessweek.com/magazine/content/11_13/b4221070014682.htm.>.

* cited by examiner

DISPLAYING SOCIAL OPPORTUNITIES BY LOCATION ON A MAP

CROSS REFERENCE TO RELATED APPLICATIONS

This application is related to U.S. patent application Ser. No. 12/977,027, filed on Dec. 22, 2010, the content of which is incorporated by reference herein in its entirety.

BACKGROUND

This invention relates generally to social networking, and in particular to providing relevant information for a user of a social networking system based on user location and social information.

Social networking systems have become prevalent in recent years because they provide a useful environment in which users can connect to and communicate with other users. A variety of different types of social networking systems exist that provide mechanisms allowing users to interact within their social networks. In this context, a user may be an individual or any other entity, such as a business or other non-person entity. Accordingly, while enabling social communications among friends, a social networking system can also be a valuable tool for businesses to engage with potential consumers.

However, users of social networking systems traditionally have not been able to obtain information that is relevant and timely based on their interests, connections to others, and particular locations. Users have not yet been able to exploit the relationships and connections among members of a social networking website, nor the rich user information contained therein, in a meaningful way. Similarly, third-party content providers, such as businesses, also have not been able to exploit social networking systems to provide information at the appropriate time and place to best take advantage of a potential customer's interest.

SUMMARY

To enable a social networking system to provide relevant content objects at the request of social networking system users, embodiments of the invention provide a mechanism for matching user location, interests, and other social information with the content, location, and timing associated with content objects, including both third-party content objects and user generated content objects. In particular, embodiments of the invention enable relevance scores to be calculated for content objects with respect to relevance specific to a user of the social networking system, from which a ranked list of content objects can be provided to the user, where the content objects are relevant to them based on their interests, location, and other social information.

In one embodiment, the social networking system provides a user interface on a mobile device displays a map containing pins, where each pin represents a content object in actionable proximity to a user (e.g., a nearby friend, deal, etc.). The content objects selected to be presented as pins to the user are those content objects with sufficiently high relevance scores. Multiple pins for a nearby area can be clustered. The user can switch between zoom levels for the map, thereby showing pins at varying distances from the user's current location (e.g., nearby, close, and far). In one embodiment, the zoom levels are based on the existence of relevant content rather than being predetermined distances from the user. In one embodiment, the system is configured to receive a request from the user to automatically select the content object with the highest relevance score instead of displaying the map of pins.

DETAILED DESCRIPTION

Overview of a Social Networking System Network

Figure 1:
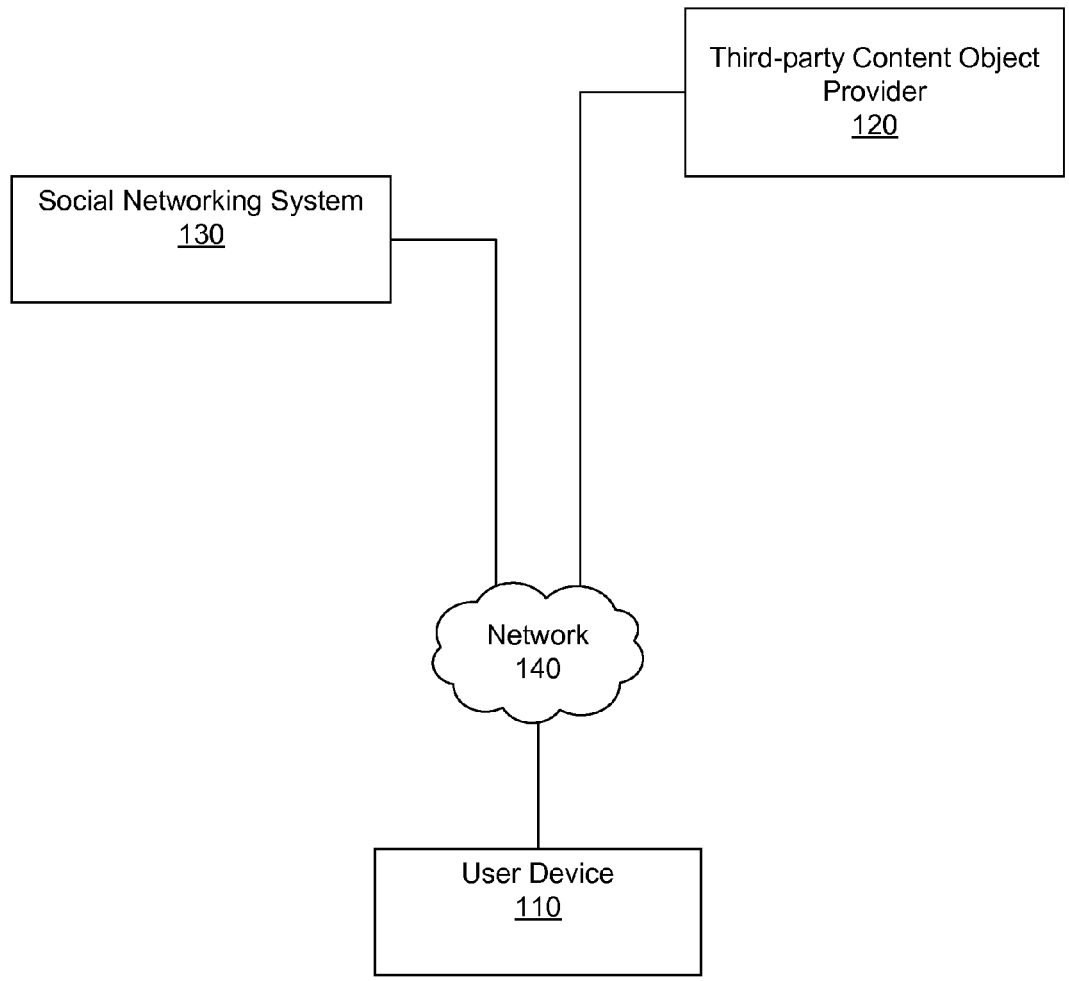
FIG. 1 is a network diagram of one embodiment of a system for responding to the requests of social networking system user regarding nearby, relevant activities.

FIG. 1 is a network diagram of one embodiment of a system for responding to the requests of social networking system user (e.g., member) regarding nearby, relevant activities. The system 100 includes one or more user devices 110, one or more third-party content object provider 120, the social networking system 130 and a network 140. For purposes of illustration, the embodiment of the system 100 shown by FIG. 1 includes a single third-party content object provider 120 and a single user device 110. However, in other embodiments, the system 100 may include more user devices 110 and/or more third-party content object providers 120. In certain embodiments, the social networking system 130 is operated by the social network provider, whereas the third-party content object providers 120 are separate from the social networking system 130 in that they may be operated by different entities. In various embodiments, however, the social networking system 130 and the third-party content object providers 120 operate in conjunction to provide social networking services to users of the social networking system 130. In this sense, the social networking system 130 provides a platform, or backbone, which other systems, such as third-party content object providers 120, may use to provide social networking services and functionalities to users across the Internet.

A user device 110 comprises one or more computing devices that can receive input from a user and can transmit and receive data via the network 140. For example, the user device 110 may be a desktop computer, a laptop computer, a smart phone, a personal digital assistant (PDAs) or any other device including computing functionality and data communication capabilities. The user device 110 is configured to communicate with the third-party content object provider 120 and the social networking system 130 via the network 140, which may comprise any combination of local area and/or wide area networks, using both wired and wireless communication systems. In one embodiment, the user device 110 displays content from the third-party content object provider 120 and/or from the social networking system 130.

The third-party content object provider 120 comprises one or more sources of content objects, which are communicated to the user device 110 at appropriate times. In one embodiment, the third-party content object provider 120 is a separate entity from the social networking system 130. For example, the third-party content object provider 120 is associated with a first domain while the social networking system 130 is associated with a separate social networking domain. In various embodiments, the third-party content object provider 120 is located on a website or alternatively a server, separate or in conjunction from the website or server that hosts the social networking system 130.

The third-party content objects, as the term is used herein, include any content object generated by a third-party content object provider 120 rather than by a user of the social networking system 130. Content objects generally may include information regarding things or activities of interest to the user. Third-party content objects include informational content objects, such as movie show times, movie reviews, restaurant reviews, restaurant menus, product information and reviews, etc., as well as incentive content objects, such as coupons, discount tickets, gift certificates, etc. according to one embodiment. In addition, some third-party content objects may include a combination of information and incentives. Other examples of content objects include event content objects associated with an event (e.g., a New Year's Eve party) or ad-hoc gathering objects (e.g., an impromptu gathering of 100 people in Union Square, San Francisco). Examples of content objects and the ways in which content objects may be presented or used are described below.

The social networking system 130 comprises one or more computing devices storing a social network, or a social graph, comprising a plurality of users and providing users of the social network with the ability to communicate and interact with other users of the social network. According to various embodiments, the social networking system 130 may comprise a website, or alternatively a server that can be accessed through a wired or wireless network 140 by user devices 110 or third-party content object providers 120. In use, users join the social networking system 130 and then add connections (i.e., relationships) to a number of other users of the social networking system 130 to whom they desire to be connected. As used herein, the term "friend" refers to any other user of the social networking system 130 to whom a user has formed a connection, association, or relationship via the social networking system 130. Connections may be added explicitly by a user or may be automatically created by the social networking systems 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral, or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation. Using a social graph, therefore, a social networking system may keep track of many different types of objects and the interactions and connections among those objects, thereby maintaining an extremely rich store of socially relevant information.

In addition to establishing and maintaining connections between users and allowing interactions between users, the social networking system 130 provides users with the ability to take actions on various types of items, or objects, supported by the social networking system 130. These items may include groups or networks (where "networks" here refer not to physical communication networks, but rather social networks of people, entities, and concepts) to which users of the social networking system may belong, events or calendar entries in which a user might be interested, computer-based applications that a user may use via the social networking system 130, transactions that allow users to buy or sell items via the service, and interactions with advertisements that a user may perform on or off the social networking system.

These are just a few examples of the items upon which a user may act on a social networking system, and many others are possible. A user may interact with anything that is capable of being represented in the social networking system 130 or by an external system of the third-party content object provider 120, which is separate from the social networking system 130 and coupled to the social networking system 130 via a network 140.

The social networking system 130 is also capable of linking a variety of entities. For example, the social networking system 130 enables users to interact with each other as well as receive content from third-party content object providers 120 or other entities, or to allow users to interact with these entities through an API or other communication channels.

The social networking system 130 also includes user-generated content objects, which enhances a user's interactions with the social networking system 130. User-generated content may include anything a user can add, upload, send, or "post," to the social networking system 130. For example, a user communicates posts to the social networking system 130 from a user device 110. Posts may include data such as status updates or other textual data, location information, photos, videos, links, music or other similar data and/or media. Content may also be added to the social networking system 130 by a third-party through a "communication channel," such as a newsfeed or stream.

Content objects, generally, represent single pieces of content that are represented as objects in the social networking system 130. In this way, users of the social networking system 130 are encouraged to communicate with each other by posting text and content objects of various types through various communication channels, increasing the interaction of users with each other and increasing the frequency with which users interact with the social networking system 130.

Social Networking System Architecture

Figure 2:
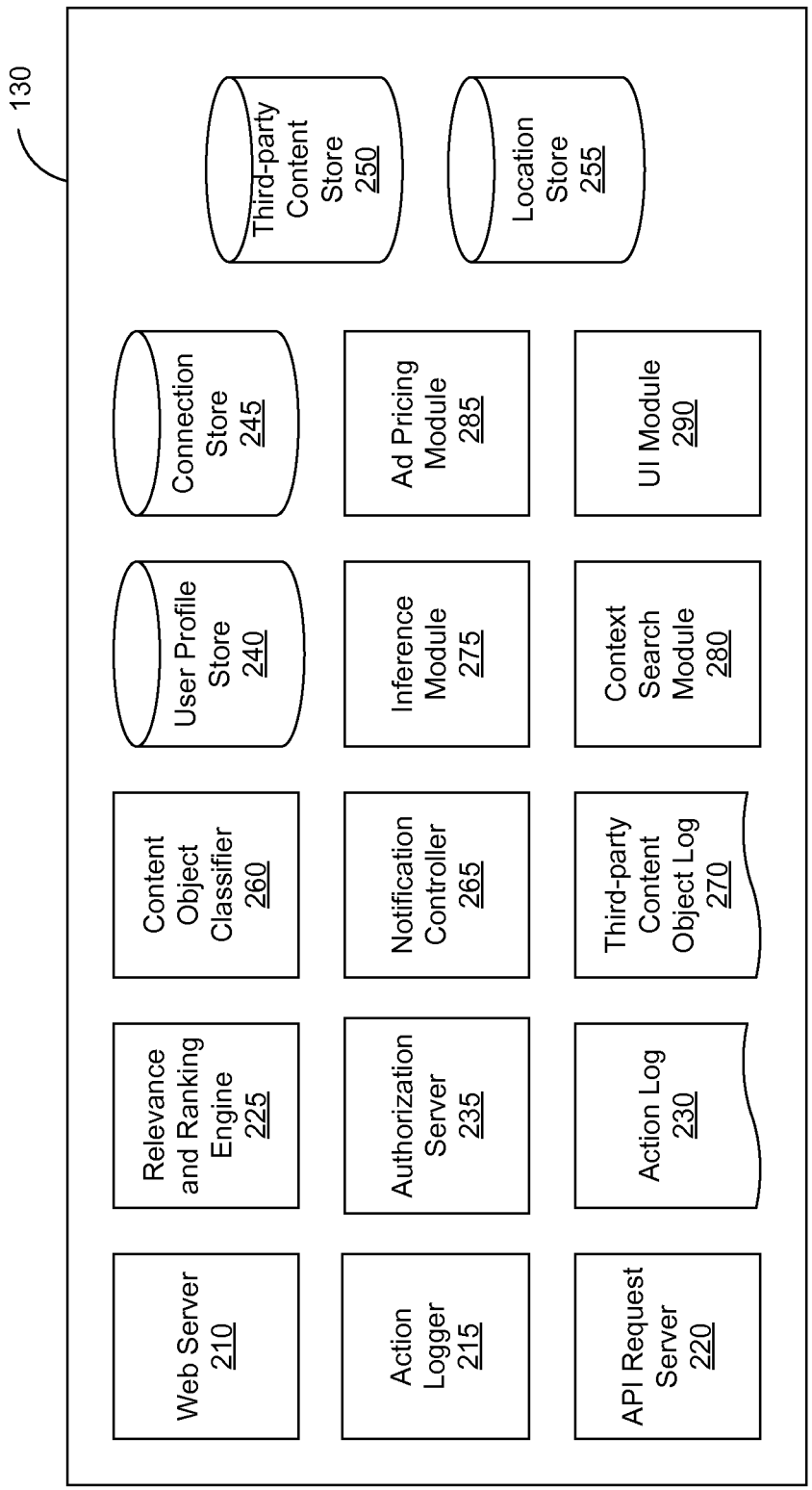
FIG. 2 is a diagram of a social networking system, in accordance with an embodiment of the invention.

FIG. 2 is a diagram of one embodiment of a social networking system 130. The embodiment of a social networking system 130 shown by FIG. 2 includes a web server 210, an action logger 215, an API request server 220, a relevance and ranking engine 225, a content object classifier 260, a notification controller 265, an action log 230, a third-party content object exposure log 270, an inference module 275, an authorization server 235, a search module 280, an ad targeting module 285, a user interface module 290, a user profile store 240, a connection store 245, a third-party content store 250, and a location store 255. In other embodiments, the social networking system 130 may include additional, fewer, or different modules for various applications. Conventional components such as network interfaces, security mechanisms, load balancers, failover servers, management and network operations consoles, and the like are not shown so as to not obscure the details of the system.

As described above in conjunction with FIG. 1, the social networking system 130 comprises a computing system that allows users to communicate or otherwise interact with each other and access content as described herein. The social networking system 130 stores user profiles describing the users of a social network in a user profile store 240. The user profiles include biographic, demographic, and other types of descriptive information, such as work experience, educational history, hobbies or preferences, interests, location, and the like. For example, the user profile store 240 contains data structures with fields suitable for describing a user's profile. When a new object of a particular type is created, the social networking system 130 initializes a new data structure, i.e., a "node" of the corresponding type, assigns a unique object identifier to it, and begins to add data to the object as needed. This might occur, for example, when a user becomes a user of the social networking system 130, the social networking system 130 generates a new instance of a user profile in the user profile store 240, assigns a unique identifier to the user profile, and begins to populate the fields of the user profile with information provided by the user.

In addition, the user profile store 240 may include data structures suitable for describing a user's demographic data, behavioral data, and other social data. Demographic data typically includes data about the user, such as age, gender, location, etc., e.g., as included in the user's profile. Behavioral data typically includes information about the user's activities within the social networking system 130, such as specific actions (posts, likes, comments, etc.), activity levels, usage statistics, etc. Other social data comprises information about the user from within the social networking system 130 that is not strictly demographic or behavioral, such as interests or affinities, etc. In one embodiment, user's interests may be explicitly specified in the user's profile or interests that may be inferred from the user's activities in the social networking system (e.g., uploaded content, postings, reading of messages, etc). Additionally, the user profile store 240 includes logic for maintaining user interest information for users according to one or more categories. Categories may be general or specific, e.g., if a user "likes" an article about a brand of shoes the category may be the brand, or the general category of "shoes" or "clothing." Multiple categories may apply to a single user interest. In addition, the user profile store 240 may be accessed by other aspects of the social networking system 130.

For example, the user profile store 240 includes logic for maintaining interest information for users according to one or more categories. Categories may be general or specific, e.g., if a user "likes" an article about a brand of shoes the category may be the brand, or the general category of "shoes" or "clothing." Multiple categories may apply to a single user interest. In addition, the user profile store 240 may be accessed by other aspects of the social networking system 130.

The social networking system 130 further stores data describing one or more connections between different users in a user connection store 245. The connection information may indicate users who have similar or common work experience, group memberships, hobbies, educational history, or are in any way related or share common attributes. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. The connection store 245 includes data structures suitable for describing a user's connections to other users, connections to third-party content object providers 120, or connections to other entities. The connection stores 245 may also associate a connection type with a user's connections, which may be used in conjunction with the user's privacy setting, to regulate access to information about the user. In addition, the connection store 245 may be accessed by other aspects of the social networking system 130.

The web server 210 links the social networking system to one or more user devices 110 and/or one or more third-party content object providers 120 via the network 140. The web server 210 serves web pages, as well as other web-related content, such as Java, Flash, XML, and so forth. The web server 210 may include a mail server or other messaging functionality for receiving and routing messages between the social networking system 130 and one or more user devices 110. The messages can be instant messages, queued messages (e.g., email), text and SMS messages, or any other suitable messaging format.

The Application Programming Interface (API) request server 220 allows one or more third-party content object providers 120 to access information from the social networking system 130 by calling one or more APIs. The API request server 220 also may allow third-party content object providers 120 to send information to the social networking system by calling APIs. For example, a third-party content object provider 120 sends an API request to the social networking system 130 via the network 140 and the API request server 220 receives the API request. The API request server 220 processes the request by calling an API associated with the API request to generate an appropriate response, which the API request server 220 communicates to the third-party content object provider 120 via the network 140.

The action logger 215 is capable of receiving communications from the web server 210 about user actions on and/or off the social networking system 130. The action logger 215 populates the action log 230 with information about user actions, allowing the social networking system 130 to track or monitor various actions taken by its users within the social networking system 130 and outside of the social networking system 130. Any action that a particular user takes with respect to another user is associated with each user's profile, through information maintained in the action log 230 or in a similar database or other data repository. Examples of actions taken by a user within the social network 130 that are identified and stored may include, for example, adding a connection to another user, sending a message to another user, reading a message from another user, viewing content associated with another user, attending an event posted by another user or other actions interacting with another user. When a user takes an action within the social networking system 130, the action is recorded in the action log 230. In one embodiment, the social networking system maintains the action log 230 as a database of entries. When an action is taken within the social networking system 130, an entry for the action is added to the action log 230. The relevance and ranking engine 225 includes logic for calculating a relevance score for content objects (including both user-generated content objects and third-party content objects) relative to a user, for ranking the content objects by their relevance scores, and for selecting content objects for sending to users as notifications or as responses to user requests. To calculate the relevance score, the relevance and ranking engine 225 determines a location value by comparing the content object location and a current location for the user device 210, determines an interest value based on whether the content object categories are included in the user's interests, determines a time value based on whether the current time is within the delivery time range for the content object, and determines a connection value based on how many of the user's connections are associated with the content object. Then, the relevance and ranking engine 225 combines the location value, interest value, connection value, and time value to determine the relevance score for the content object with respect to the user. In one embodiment the values are higher for a better fit (closer proximity, great similarity, etc.) and approach a value of one, and are multiplied together to yield the relevance score. From the relevance scores for each content object, the relevance and ranking engine 225 ranks the content objects for a user, e.g., from highest relevance score to lowest. The relevance and ranking engine 225 then can select content objects to send to a notification controller 265, or can serve the highest ranked content object directly to the user device 110 as a notification(s).

The content object classifier 260 includes logic for assigning each of the content objects a location, a category, and a delivery time range. Categories may reflect various categories of user interests, and may be associated with the interests themselves, e.g., a user "likes" an article about a brand of shoes and the category is the brand, or the article about the shoe brand is assigned a general category of "shoes" or "clothing." Multiple categories may apply to a single content object. General or specific locations may be assigned to content objects as well, e.g., a city, a particular street name or intersection, or GPS coordinates. A delivery time range is assigned to each content object, e.g., using a useful range based on the hours the associated business is open.

Additionally, user actions may be associated with exposure to third-party content objects from one or more third-party content object providers 120. Thus, in conjunction with the action log 230, a third-party content object log 270 is maintained of user exposures to such objects and when the last exposure occurred. The action logger 215 receives data describing a user's interaction with an object and stores it to the third-party content object log 270. The third-party content object log 270 includes logic for storing user exposures to third-party content objects and associations between users and objects. The exposure information can be used to determine whether to expose the user to the same or similar content objects, and for adjusting the ranking and selection of content objects on the basis of whether the user previously has been exposed to the same or similar content object. In addition, if a user becomes associated with a content object via an action, e.g., uses an incentive, goes to the location, etc., that information also is stored, and can be used for re-ranking and re-selecting the content objects.

The notification controller 265 provides information regarding content objects to the user device 110. Information may be pushed to the user device 110 as notifications, or information may be pulled to the user device responsive to a request received from the user device 110. In the push circumstance, notifications of content objects are initially pushed according to a default rate. Based on user engagement with the notifications, the notification controller 265 may adjust the rate in which notifications are provided to the user device 110. By adjusting the initial settings, the notification controller 265 provides notifications of content objects to the user device 110 when the user is more likely to engage with the notifications. Information may be pulled to the user device at any time. Additionally, the type of content that is provided to the client device 110 may be updated based on the user engagement.

The authorization server 235 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external websites or any entity that can potentially access the information. The information that can be shared by a user comprises user profile information like profile photo, phone numbers associated with the user, user's connections, actions taken by the user such as adding a connection, changing user profile information and the like.

The useful social information that is tracked and maintained by a social networking system can be thought of in terms of a "social graph," which includes a plurality of nodes that are interconnected by a plurality of edges. Each node in the social graph may represent something that can act on and/or be acted upon by another node. Common examples of nodes include users, non-person entities, content objects, groups, events, messages, concepts, and any other things that can be represented by an object in a social networking system. An edge between two nodes in the social graph represents a particular kind of connection between the two nodes, which may result from an action that was performed by one of the nodes on the other node.

The social networking system 130 may receive a request to associate the web content with a node in the social networking system 130. An external website (e.g., of the third party content object provider 130) incorporates a tag into the markup language document for the web page(s) of the web content to claim ownership of the pages/domain in the context of the social networking system 130. In some cases, an entire domain or collection of web pages is associated with a unique identifier that associates the web pages with a node. Once established, the social networking system 130 tracks data associated with the node in the action log 230.

Data stored in the connection store 245, the user profile store 240 and the action log 230 allows the social networking system 120 to generate a social graph that uses nodes to identify various objects and edges connecting nodes to identify relationships between different objects. An edge between two nodes in the social graph represents a particular kind of connection between the two nodes, which may result from an action that was performed by one of the nodes on the other node.

The third-party content object store 250 stores content objects received from third parties. The third-party content objects include informational content objects, such as movie show times, restaurant menus, etc., as well as incentive content objects, such as coupons, discount tickets, gift certificates, etc. In addition, some third-party content objects may include a combination of information and incentives.

The location store 255 stores location information received from user devices 110 associated with users. The location information used by the social networking system 130 may be obtained directly from user devices 110, e.g., at the time a notification is to be sent or at various predetermined time intervals, or the location information may be a last stored location received from the user device 110. In addition, the location store 255 may receive updated location information, e.g., in response to a change in the location of a user device 110. In one embodiment, if an updated location is received, the updated location is provided to the relevance and ranking engine 225 for re-ranking and/or re-selecting the third-party content objects in view of the updated location information.

In general, the selection or ranking of content objects may occur at varying intervals based on several variables, such as always at the beginning of a period during which a notification would be served, or every X minutes during a period during which notifications will be served, or every X minutes all the time (e.g., so that it's ready when a search happens), only in response to a change in location or expiration of a delivery time for a content object, etc. Alternatively, the ranking of content objects may occur as a result of user demand. The user may explicitly request the ranking by submitting a request for relevant information happening within the vicinity of the user. The request may be received in response to user selection of a "refresh" element included in a user application associated with the present disclosure. The request may also be implicit. For example, upon launching of the user application, a request may be automatically received for the ranking.

The social networking system 130 implements context search using a context search module 280. Context search results are search results that are relevant to the user based on their current location as well as their social information. In this way, the context search results are tailored to the user's interests, connections, and location at the time of the search. The context search module 280 incorporates location information, search results and relevance score information obtained from the relevance and ranking engine 225 in order to provide a ranked list of search results and/or for selection of third-party content objects as the basis for serving notifications.

The ad pricing module 285 combines social information, the current time, and location information to provide relevant advertisements, in the form of notifications, to a user. Advertisements of increased relevance to a user are more likely to result in a purchase. Dividing consumers according to their interests based on social information allows merchants to calculate the value of their potential customers. Advertisements provided through the social networking system 130 may be priced according to the value of the customer to the merchant, as indicated by their social information.

In one embodiment, the UI (or User Interface) module 290 is configured to display a map containing pins on a user device 110, where each pin represents a content object in actionable proximity to a user (e.g., a nearby friend, deal, etc.). The content objects selected to be presented as pins to the user are those content objects with sufficiently high relevance scores. Multiple pins for a nearby area can be clustered. The UI module 290 provides the user with the ability to switch between zoom levels for the map, thereby showing pins at varying distances from the user's current location (e.g., nearby, close, and far). In one embodiment, the zoom levels are based on the existence of relevant content rather than being predetermined distances from the user.

In one embodiment, the UI module 290 is configured to display a ranked list of search results on a client device 110 that have been ranked by the context search module 280. The UI module 290 is additionally configured to generate an advertisement dashboard for merchants advertising through the social networking system 130. The advertisement dashboard allows merchants to control the distribution and price they pay for their advertisements. For both functions, the UI module is configured to generate a user interface that a client device 110 or a third-party content object provider (or merchant) 120 may interact with.

An inference module 275 determines overlapping interests between users in the social networking system 130. By determining the overlapping interests between a user and his or her friends, the inference module 275 may identify which interests may be imputed to the user based on the interests of the user's friends. Thus, through the user's friends, the inference module 275 allows the social networking system 130 to identify interests for the user that are not explicitly indicated by the user.

The third-party content object store 250 stores content objects received from third parties. The third-party content objects include informational content objects, such as movie show times, movie reviews, restaurant reviews, restaurant menus, product information and reviews, etc., as well as incentive content objects, such as coupons, discount tickets, gift certificates, etc. In addition, some third-party content objects may include a combination of information and incentives.

The location store 255 stores location information received from user devices associated with users. The location information used by the social networking system 130 may be obtained directly from user devices 110, e.g., at the time a notification is to be sent or at various predetermined time intervals, or the location information may be a last stored location received from the user device 110. The location information may also be obtained along with a request from a user. In addition, the location store 255 may receive updated location information, e.g., in response to a change in the location of a user device 110. In one embodiment, if an updated location is received, the updated location is provided to the relevance and ranking engine 225 for re-ranking and or re-selection of the content objects in view of the updated location information.

Figure 3:
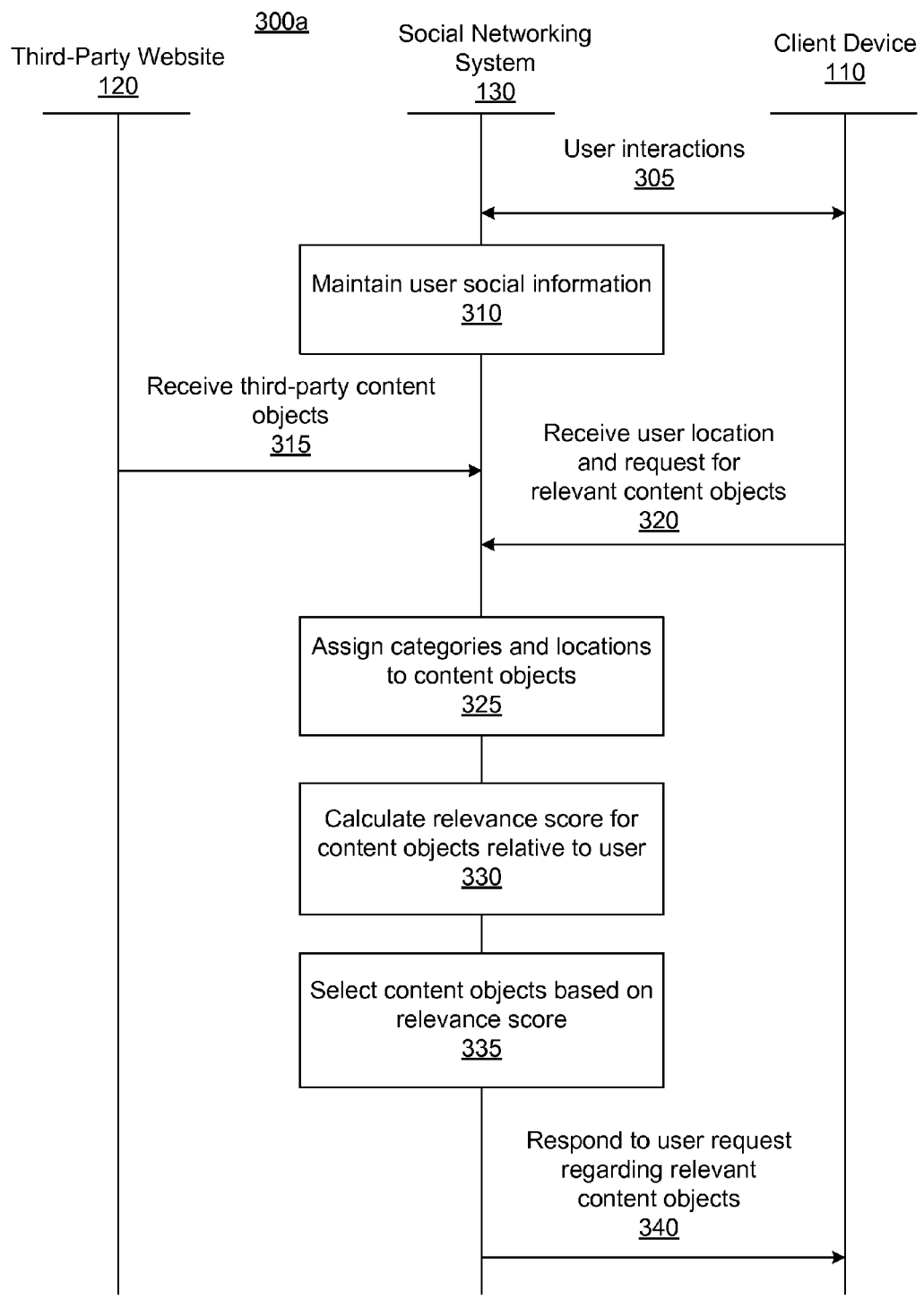
FIG. 3 is an interaction diagram of one embodiment of a process for responding to a request for information relevant to a user of a social networking system based on user location and social information.

Providing Location Based, Relevant Content Objects for a Social Networking System User FIG. 3 is an interaction diagram of one embodiment of a process for responding to a request for information relevant to a user of a social networking system based on user location and social information.

Initially, users, via user devices 110 interact 305 with each other via the social networking system 130 and with the social networking system 130 directly, providing it information about the user such as user interest and connection information. The social networking system 130 maintains 310 the user social information (e.g., interest and connection information for each user. For example, the social networking system 130 may categorize the interest information into categories.

The social networking system 130 also receives 315 third-party content objects from one or more third parties 120. The third-party content objects may include informational content objects, such as movie show times, movie reviews, sale information, restaurant menus, etc., as well as incentive content objects, such as coupons, discount tickets, gift certificates, etc. In addition, some third-party content objects may include a combination of information and incentives.

The social networking system 130 receives 320 a request from a requesting user for information regarding relevant, nearby content objects. The user request may include information about the location of the user device 110. This information may be obtained directly from the user device 110, e.g., at the time of the request, at the time a notification is to be sent or at various time intervals, or the social networking system 130 may retrieve a last stored location for the user device 110. In addition, when a user device 110 changes locations, the updated location information may be provided to the social networking system 130. Alternatively, the user may provide a location specifying a constraint on the kinds of content objects in which they are interested.

Content objects, (including both user-generated and third-party content objects) are assigned 325 categories, locations, and delivery time ranges. For example, categories may be established by the social networking system 130 that reflect various categories of interests of users of the social networking system 130. The categories may be associated with the interests themselves, e.g., if a user "likes" an article about a brand of shoes, the category may be the brand. Alternatively, the social networking system 130 may assign the article about the shoe brand a general category of "shoes" or "clothing." The social networking system 130 may assign both of these categories to a single content object; thus, multiple categories may apply to a single content object. For example, for an incentive offering 20% off a specialty coffee drink at a particular coffee shop, the promotion may be assigned a category "food," type "beverage," and subtype "coffee." These tags can be matched to categories associated with user interests.

Locations may be assigned to content objects as well. For example, a coupon for $2.00 off of a movie ticket at a particular movie theater chain may apply to all theaters in the chain, or just one theatre. A location may be general, e.g., a city, or specific, e.g., a particular street name, or intersection, or GPS coordinate. One or more such locations are assigned to each content object. Finally, a delivery time range is assigned to a content object. The range may reflect appropriate hours for the item. For example, if the content object is a coupon for a donut store that is open only in the morning, the range for the notification likely would correspond to the hours during which the donut store is open, or some other useful range related to the open hours, e.g., fifteen minutes before opening to thirty minutes before closing.

The social networking system 130 calculates 330 a relevance score for each content object relative to the requesting user. The social networking system 130 uses the location, interest, time, and connection information for the user and the content objects to calculate the score. For example, the social networking system 130 may first calculate scores for each of these categories that are combined to get the relevance score.

In one embodiment, for each content object the social networking system 130 determines a location value based on the proximity between the content object location and a current location associated with the user device 110. The social networking system 130 also determines an interest value based on whether the category or categories assigned to the content object are included in the category or categories associated with the user's interests. The social networking system 130 also determines a time value based on whether the current time is within the delivery time range for the content object. For example, a discount coupon for lunch at a restaurant may be associated with lunch hours and is accordingly of higher interest during the hours commonly associated with lunch. And the social networking system 130 determines a connection value based on how many, if any, of the user's connections are associated with the content object. For example, a connection associated with the content object may include information or an incentive for a business that one of the user's connections is currently at, e.g., a connection of the user is at the frozen yogurt store that the incentive applies to. Then, the social networking system 130 combines the location value, interest value, connection value, and time value to determine the relevance score for the content object with respect to the user. In one embodiment the values are higher for a better fit (closer proximity, great similarity, etc.) and approach one, and are multiplied together to yield the relevance score.

From the relevance scores of the content objects, the social networking system 130 selects 335 the content objects for a user, e.g., from a ranking of highest relevance score to lowest, or by selection of the highest relevance scored items. The social networking system 130 responds to the user's request for relevant content objects. The content objects are provided to the user. In one embodiment, the UI module 290 renders information regarding the content objects, for example in the form of a map with pins. In one embodiment, the social networking system 130 receives a request user from a user for only a single content object. In this case, the social networking system provides the content object with the highest relevance score to the requesting user.

Once a user is exposed to a content object, the social networking system 130 stores that exposure. In addition, the social networking system 130 monitors whether the user uses an incentive associated with the content object, goes to the location of the information, or otherwise becomes associated with the content object, and if so, the social networking system 130 stores that information.

Map with Pins Illustrating Relevant, Nearby Content Objects Requested by a User

FIG. 4 is a series of sample screenshots illustrating how a client device 110 may display information regarding nearby activities relevant to a user of a social networking system 130 responsive to the user's request. In FIG. 4a, a map 410 illustrates the real world region around the requesting user. The map 410 displays a number of content objects 415 that have been determined to be the most relevant content objects according to their relevance scores, which are based in part on the requesting user's location.

Content objects are presented as pins (e.g., pins A 415a, B 415b, and C 415c) based on the real world locations where the requesting user may interact with the real world entity associated with the content objects. For example, the content object may be a third-party content object comprising a coupon for a free smoothie at a smoothie store. In this example, pin 415 may represent the location of the smoothie store where the coupon is redeemable. In another example, pin 415 may represent the location where three of their friends are currently located.

In some circumstances, multiple content objects presented to the requesting user as pins 415 may be in such close proximity in the real world, that the map 410 is unable to display the multiple pins in a separate, independently identifiable manner. In one embodiment, pins in close proximity are grouped into a single, differently shaped group pin 420 that represents multiple content objects at once. A group pin 420 may visually indicate the number of pins 415 contained within the group pin 420. For example, group pin 420a indicates that three separate pins are contained within the group pin 420a.

Figure 4A:
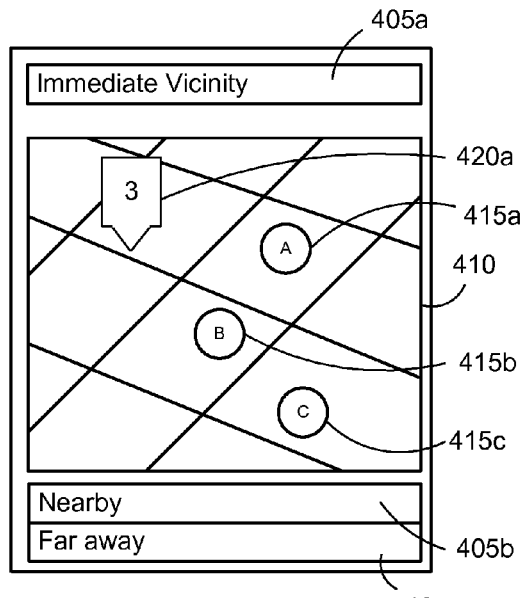
FIG. 4 is a series of sample screenshots illustrating how a client device may display information regarding nearby activities relevant to a user of a social networking system responsive to the user's request.

In response to a request for information from a user, map 410 initially displays the area immediately surrounding the user. The user, however, may change the real world area illustrated by map 410. The user may also change the level of zoom at which the surrounding real world area is shown. FIG. 4a further illustrates that the requesting user is presented with multiple zoom settings 405 to allow a requesting user to switch between different zoom levels of the surrounding environment. In the example embodiment of FIG. 4a, the zoom levels include the immediate vicinity of the requesting user 405a as the highest granularity zoom level, a nearby zoom level 405b including a larger swath of the surrounding area as compared with the immediate vicinity 405a, and a far away zoom level 405c that covers a much larger scope than the previous two zoom levels. FIG. 4a illustrates a map 410 displayed at the immediate vicinity 405a zoom level.

In one embodiment, the zoom levels are based on absolute distances from the requesting user. For example, in the immediate vicinity 405a, the map 410 may cover one square mile, whereas the nearby zoom level 405b covers five square miles, and the far away zoom level 405c covers fifty square miles. In another embodiment, zoom levels may be based in part upon the geographical location of the users, whereby zoom levels are specified for various cities, states, and suburban areas. For example, if the user is located in the bay area of California, the far away zoom level 405c may be the entire bay area rather than fixed fifty mile distance.

Map 410 is configured to display only a limited number of pins 415 or block pins 420. The number of pins 415 or block pins 420 displayed may be determined by the social networking system 130 or the requesting user. In one embodiment, the number of pins 415 or block pins 420 is a fixed amount. In another embodiment, the number of pins 415 or block pins 420 is based on a relevance score threshold. Only content objects above the relevance score threshold are displayed as part of pins 415 or block pins 420. The relevance score threshold may vary depending upon the zoom level. For example, at a immediate vicinity zoom level 405a, there may be comparatively few content objects that are present to provide to the requesting user, and thus the relevance score threshold for this zoom level may be lower. In contrast, at a far away zoom level 405c, there may be many more content objects as compared to the immediate vicinity zoom level 405a case, and as a result the relevance score threshold for this zoom level may be higher. Thus, a requesting user changing from a smaller zoom level to a larger zoom level may reflect the user's interest in receiving information about more relevant content objects, despite the fact that they are further away from the requesting user's present location. Adjusting the relevance score threshold based on zoom level ensures that the user is always presented with a sufficient, but not excessive, number of pins 415 and block pins 420 to interact with.

Figure 4B:
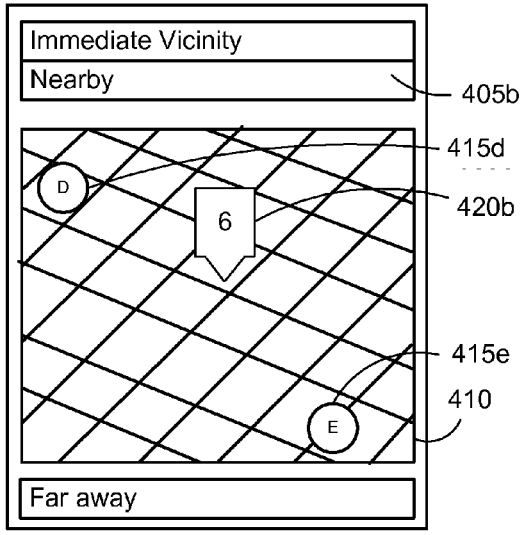

FIG. 4b illustrates the map 410 at the nearby zoom level 405b. In the example embodiment of FIG. 4b, group pin 420b indicates that it includes six pins, for example group pin 420a and pins 420a, 420b, and 420c, along with three others that were not present in map 410 as displayed in FIG. 4a. FIG. 4b further includes two new pins 415d, and 415e.

Figure 4C:
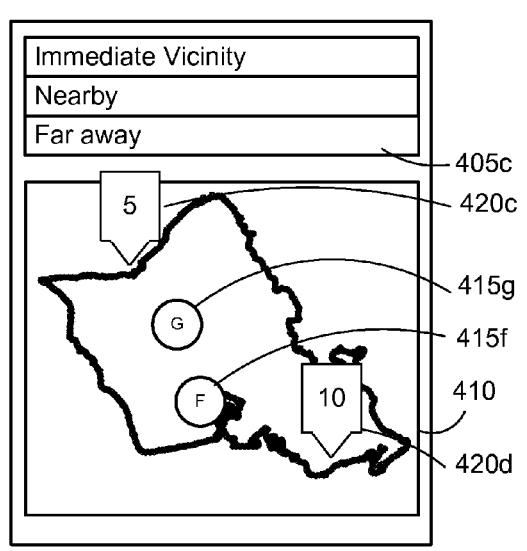

FIG. 4c illustrates the map 410 at the far away zoom level 405c. Group pins 420d and 420c include ten and five pins, respectively. Pins 415g and 415f represent individual content objects that are sufficiently far from other pins to be displayed separately from group pins, despite the area covered by map 410.

Figure 4D:
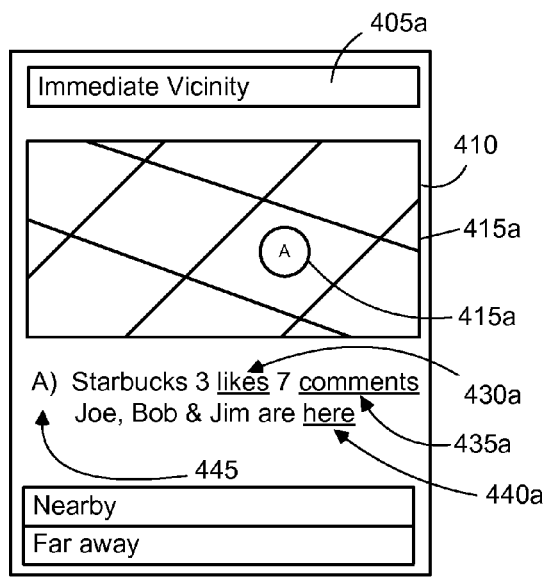

FIG. 4d illustrates a user interface presenting a requesting user with more information about a selected content object 445 illustrated by a pin 415a. In one embodiment, map 410 still presents the selected pin, however the map has been reduced in size with respect to the total screen area of the user device 110. The user interface presents information about the selected content object 445. The presented information may include, for example, the users of the social networking system 130 who have indicated affinity for the content object who are also connected to the requesting user through the social networking system, comments on the content object made by users connected with the requesting user through the social networking system, and/or a list of users connected with the requesting user through the social networking system who are currently present at the real-world location associated with the content object.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising: maintaining social information for a user, the social information comprising the user's interests;
    accessing a plurality of content objects, each content object associated with a geographic location, a category, and a delivery time range;
    receiving a request for information from a user device;
    receiving a user location from the user device;
    determining a relevance score for the content objects, where determining the relevance score for at least one of the content objects comprises: determining that the user location is within a proximity of the content object's geographic location;
    determining that the user's interests from the maintained social information for the user matches the content object's category; and
        determining that a current time is within the content object's delivery time range;
        ranking the content objects by theft relevance scores;
        determining a zoom level of a map to display to the user:
        determining a relevance score threshold based on the zoom level of the map:
        selecting one or more of the content objects by applying the relevance scores of the content objects to the threshold: and
        sending the map with the selected content objects displayed on the map at the zoom level to the user device for display to the user.

2. The method of claim 1, wherein maintaining the social information further comprises:
    maintaining a plurality of connections between the user and other users of the social networking system.

3. The method of claim 2, wherein determining the relevance score for the at least one of the content objects further comprises:
    determining a connection value for the content object, the connection value based on a number of the user's plurality of connections associated with the content object.

4. The method of claim 1, wherein one of the content objects has an action associated with it, and wherein determining that the current time is within the content object's delivery time range comprises determining that the action can be performed by the user within the delivery time range.

5. The method of claim 1, wherein the request received from the user includes the user location.

6. The method of claim 1, further comprising storing a user exposure to one of the at least one content objects.

7. The method of claim 6, further comprising adjusting the relevance score of the content object for which a user exposure was stored.

8. The method of claim 1, further comprising:
    receiving indication of an action by the user associated with one of the content objects; and
    storing an association between the user and the content object in response to the received indication.

9. The method of claim 1, further comprising transmitting a highest ranked content object from the ranked content objects to the user device for display to the user.

10. The method of claim 1, wherein the plurality of content objects comprises third-party content objects provided by third-parties, and content objects formed based on interactions of users with the social networking system.

11. A method comprising:
    transmitting from a user device at a user location and a request for information to a social networking system configured to determine a relevance score for a plurality of content objects associated with a geographic location, a category, and a delivery time range, the social networking system determining the relevance score for at least one of the content objects comprising determining that the user location is within a proximity of the content object's geographic location, determining that the user's interests from social information of the user matches the content object's category, and determining that a current time is within the content object's delivery time range;
    receiving at the user device a ranked list of content objects based on the relevance score, each content object comprising:
        the geographic location that is within a proximity of the user location;
        the category that matches a user interest stored by the social networking system;
        the delivery time range where a current time is within the delivery time range;
    identifying a zoom level of a map to display;
    displaying a map comprising a plurality of pins displaying the geographic locations of the content objects, wherein each pin is associated with one of the content objects, each pin displays the rank of the content object, and content objects are selected for display by applying relevance scores of the content objects to a relevance score threshold based on a zoom level.

12. The method of claim 11, comprising:
    displaying a plurality of selectable zoom levels that change the zoom level.

13. The method of claim 12, wherein the plurality of selectable zoom levels are based on fixed distances.

14. The method of claim 12, wherein the plurality of selectable zoom levels are based on geographical regions.

15. The method of claim 12, wherein the plurality of selectable zoom levels are based on relevance score thresholds.

16. The method of claim 11, comprising:
    displaying a group pin representing the locations of a plurality of associated content objects, wherein the content objects associated with the group pins are located within a proximity of each other.

17. The method of claim 16, wherein the group pin displays the number of content objects it is associated with.

* * * * *